United States Patent [19]

Huber

[11] Patent Number: 4,459,522

[45] Date of Patent: Jul. 10, 1984

[54] CIRCUIT ARRANGEMENT FOR COUNTERCLOCKWISE AND CLOCKWISE ROTATION OF COMMUTATOR MOTORS

[75] Inventor: Siegfried Huber, Johannesberg, Fed. Rep. of Germany

[73] Assignee: Black & Decker Inc., Newark, Del.

[21] Appl. No.: 458,719

[22] Filed: Jan. 17, 1983

[30] Foreign Application Priority Data

Jan. 15, 1982 [DE] Fed. Rep. of Germany ....... 3201036

[51] Int. Cl.[3] .......................... H02P 1/24; H02P 3/18; H02P 7/36

[52] U.S. Cl. .................................. 318/293; 318/305; 318/336; 200/1 V; 200/157

[58] Field of Search .................... 318/293; 310/50, 47; 200/157, 1 V, 5 R, 5 E; 307/127, 113

[56] References Cited

U.S. PATENT DOCUMENTS

| | | | |
|---|---|---|---|
| 1,732,711 | 10/1929 | Boddie | 318/293 X |
| 1,804,086 | 5/1931 | Brodt | 200/1 V |
| 3,243,680 | 3/1966 | Burns . | |
| 3,413,498 | 11/1968 | Bowen | 310/47 |
| 3,445,609 | 5/1969 | Cardenas | 200/1 V |
| 3,775,576 | 11/1973 | Brown | 200/157 |
| 3,942,604 | 3/1976 | Black | 200/157 |
| 4,002,961 | 1/1977 | Chang | 200/157 |
| 4,205,434 | 6/1980 | Brozoski et al. | 200/157 |

FOREIGN PATENT DOCUMENTS

| | | | |
|---|---|---|---|
| 217544 | 10/1958 | Australia | 200/1 V |
| 531206 | 5/1976 | U.S.S.R. | 200/1 V |

*Primary Examiner*—J. V. Truhe
*Assistant Examiner*—Bentsu Ro
*Attorney, Agent, or Firm*—Ronald B. Sherer; Edward D. Murphy; Harold Weinstein

[57] ABSTRACT

In a portable power tool, two switches are provided in the handle for respectively effecting rotation of the electric motor in opposite directions. Each switch has a center contact movable between a rest contact and a working contact, the armature of the motor being connected between the two center contacts. Preferably, a common rocker actuates the two switches individually or jointly. In both the rest position of the two switches and in the case when both switches are jointly actuated, intentionally or unintentionally, the armature is short-circuited and braking occurs. Two platelets of electrically conductive synthetic material may advantageously be used as end stops for the switches so that the speed in either direction of rotation is controlled by the pressure of the operator's finger on the selected switch.

4 Claims, 6 Drawing Figures

CIRCUIT ARRANGEMENT FOR COUNTERCLOCKWISE AND CLOCKWISE ROTATION OF COMMUTATOR MOTORS

FIELD OF THE INVENTION

The invention relates to a circuit arrangement for the counterclockwise and clockwise rotation of commutator motors by the reversing of the direction of the armature current, and in particular to portable power tools and a switching arrangement for reversing the direction of drive thereof.

BACKGROUND OF THE INVENTION

In many fields of application of commutator motors, in particular with electric tools, such as drills and screwdrivers, the need frequently arises of being able to operate the motor selectively in either direction of rotation. It is well known to use for this purpose reversing switches that reverse the direction of the current flowing through the armature with respect to the current through the field coils, or in the case of a DC motor with a permanent magnet with respect to the magnetic field. The motor is, however, usually switched on and off by means of an additional switch in the power supply, for instance with an electrical hand drill by means of a trigger-switch in the handle. This operation of a portable hand tool is relatively cumbersome because for every reversal in direction of rotation, one must actuate not only the reversing switch but also the trigger-switch. Moreover, there is a risk that the reversal in the direction of rotation will inadvertently occur while the trigger-stitch, or other main switch, is actuated resulting in the likelihood of damage to the motor and possibly also the reversing switch. To avoid this latter problem, combined switches have been developed that effect a mechanical locking between the reversing switch and the main trigger-switch, see for example German Auslegeschrift No. 26 31 994, however such an arrangement increases the cost of the switch.

It has been proposed to use two switches for operating an electric motor in opposite directions of rotation, particularly DC motors. U.S. Pat. No. 3,243,680 discloses such a switching arrangement for opening and closing power operated windows of automobiles, and German Utillty Model Publication No. 1,884,374 discloses a two push button arrangement for operating a zoom lens of a cine-camera.

SUMMARY OF THE INVENTION

The present invention is concerned with improving the stitching arrangement of portable power tools, for example power drills, screwdrivers, etc.

It is an object of the present invention to provide a portable power tool with a switching arrangement in which a fast reversal in the direction of rotation of the commutator motor is possible. A feature by which this is achieved is the provision of two switches in the portable power tool either of which when actuated will cause the motor to rotate in one direction or the other, respectively, but when neither or both are operated power supply to the motor is interrupted.

A further feature of the invention is the provision of a common rocker, preferably in the handle of the portable power tool, for actuating the two switches individually or jointly. This has the advantage of enabling the switching arrangement for energising and reversing the motor to be readily and conveniently operated by one finger resting on the common rocker. Another advantage is that if the rocker as a whole is depressed, ior instance in a shock reaction, the motor will brake accompanied by interruption oi the power supply thereto. This is an advantageous safety feature for a portable power tool Another object of the invention is to simplify speed control in connection with reversal of the motor direction. A feature by which this object is achieved is the provision of platelets of electrically conductive synthetic material. whose resistance varies as a function of the pressure exerted thereupon, as stops for the operating keys or common rocker of the two switches, and utilizing the variation in resistance of these platelets to control the speed of the motor in the direction selected. This has the advantage that having selected the switch to actuate for the desired direction of rotation of the motor, the speed in that selected direction can be adjusted and controlled by simply varying the pressure of the operator's finger on the same selected switch.

Therefore, according to the present invention there is provided a portable power tool comprising a housing having a handle, an electric motor mounted in the housing and having an armature with a commutator, two switches for respectively effecting rotation of the armature in opposite directions of rotation, each switch having a center contact movable between a rest contact and a working contact, the armature being connected between the two center contacts, the working contacts being interconnected, the rest contacts being interconnected, and the working and rest contacts being arranged to be connected across a source of line voltage, and means on the handle for actuating the switches such that when neither or both switches are actuated the commutator is short circuited and supply of power to the motor is interrupted, and when one only of the switches is actuated the armature rotates in one-direction and when the other only of the switches is actuated the armature rotates in the opposite direction.

Preferably, the actuating means comprises a common rocker for actuating the switches individually or jointly.

Other objects, features and advantages of the present invention will become more fully apparent from the following detailed description of the preferred embodiment, the appended claims and the accompanying drawings.

DETAILED DESCRIPTION OF THE PREFERRED EMBODIMENTS

Figure 1A:
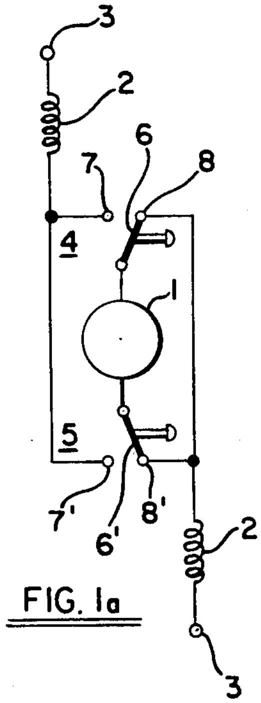
FIGS. 1*a*, 1*b* and 1*c* show three switching states of a circuit arrangement according to the invention.
Figure 1B:
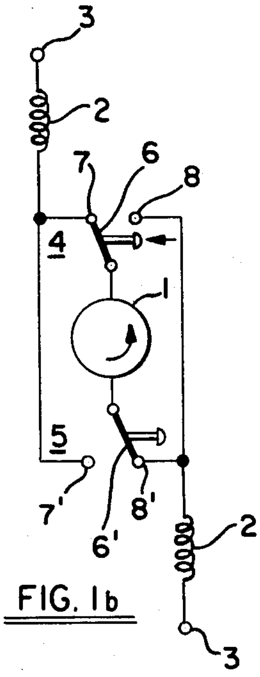
Figure 1C:
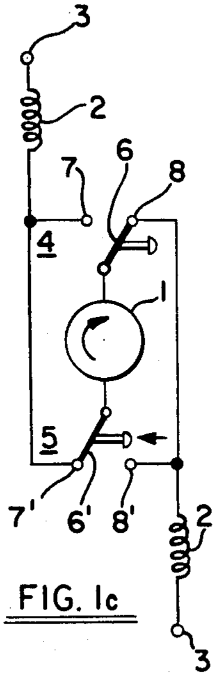

FIGS. 1*a*, 1*b* and 1*c* illustrate the three switching states of a commutator motor of reversible direction of rotation having an armature 1 and field windings 2, i.e., FIG. 1*a* on the left illustrates the rest position, FIG. 1*b* in the center the counter-clockwise rotation as one direcion of rotation, and FIG. 1*c* on the right the clockwise rotation as the other diretion of rotation. An external source of line voltage is connected across connector terminals 3. The two switches 4 and 5 are similar and are unipolar reversal switches each having movable center conact 6, 6', a stationary operating contact 7, 7', and a stationary rest contact 8, 8', respectively. The armature 1 is short-circuited and the power supply to the motor is interrupted in the rest position of both switches 4, 5 as shown in FIG. 1*a*.

When switch 4 is actuated as shown in FIG. 1*b*, the motor is energised and starts up in one direction of rotation, assumed in this case to be the counterclockwise direction of rotation. However, when the switch 5 is actuated as shown in FIG. 1*c*, the switch 4 having been released and returned to its normal unactuated position, the current flows with respect to the field windings 2 in the reverse direction through the armature 1 so that the motor rotates in the other direction of rotation. If the operator wishes to switch from one direction of rotation to the other direction, he or she must first release the switch that is actuated in a given case, which then returns automatically to the rest position shown in FIG. 1*a*. As a result of the short-circuiting of the armature 1, braking of the motor occurs. Subsequently, it is possible to actuate the other switch and the motor starts driving in the opposite direction of rotation. Upon simultaneous operation of both switches, no malfunction occurs and particularly no damage occurs to the motor or the switches. Instead, the armature 1 is short-circuited accompanied by braking and interruption of the current through the motor. Such an intentional or even unintentional depressing of both key switches results, therefore, in braking of the motor which is a safety feature of the present invention.

Figure 2:
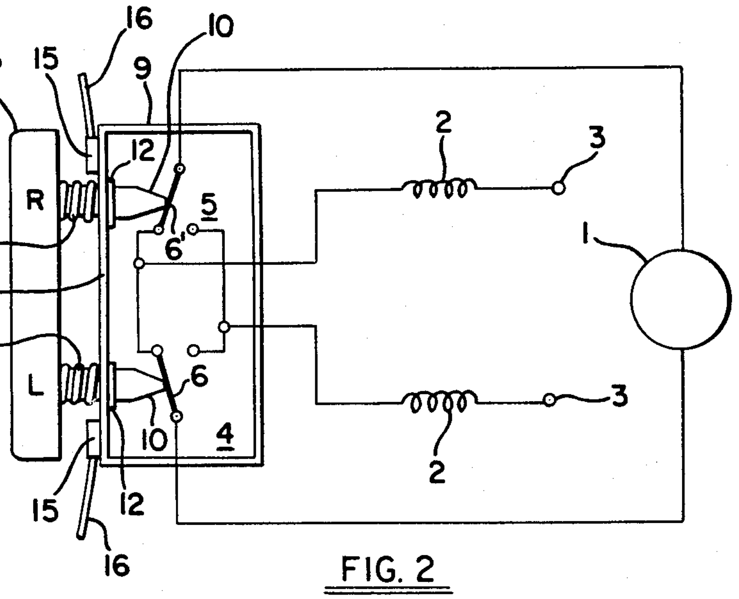
FIG. 2 shows an exemplified embodiment of a circuit according to the invention and details of the preferred switching arrangement having a common actuating rocker.

FIG. 2 schematically illustrates the preferred embodiment of a switch to effect the switching arrangement according to the invention. The circuit itself is identical with that according to FIGS. 1*a*, 1*b* and 1*c* and, therefore, the same reference numerals are used for the same parts. The two reversing switches 4, 5 are arranged in a common housing 9. Any conventional switch designs can be used, for instance even so-called microswitches with snap contacts and a short path of operation. The actuation of the two switches 4, 5 takes place separately via pressure pins 10 that are connected to the movable contacts 6, 6' and are guided in the housing 9. Coil springs 11 under compression urge the pressure pins 10 outwardly of the housing 9, outward movement of each pin 10 being limited by a collar 12 of the respective pressure pin 10 abutting a wall 17 of the switch housing 9. The actuation of the pressure pins 10, and thus of the respectively cooperating switches 4, 5, takes place by means of a common rocker 13. As can be appreciated, depression of either end of the common rocker 13, against the bias of the spring 11 compressed between that end and the housing wall 17, actuates the respective switch 4, 5 through the respective pressure pin 10. Should, such as in an emergency, the whole of the common rocker 13 be depressed, then both switches 4 and 5 will simultaneously be actuated.

Figure 4:
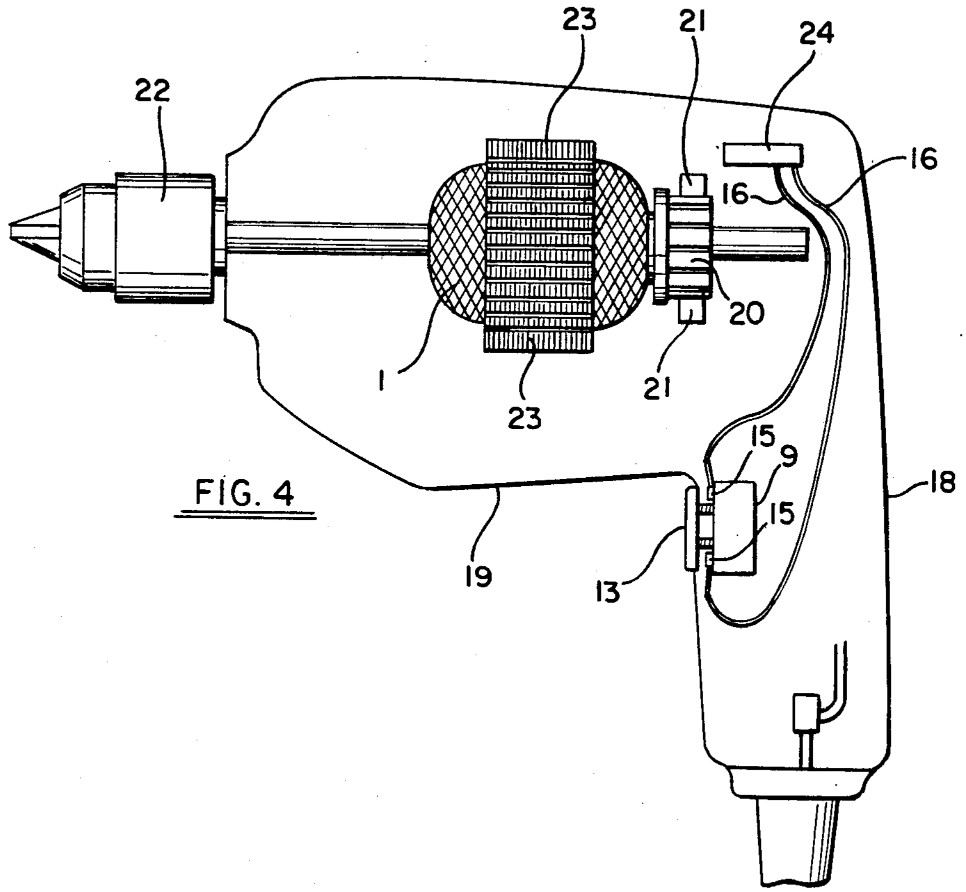
FIG. 4 diagrammatically illustrates the switching arrangement of FIG. 2 in a portable electric tool.

On the left hand side of the housing 9 and arranged beneath the ends of the rocker 13 are small members in the form of platelets 15 made of a pressure-responsive conductive synthetic material the resistance of which varies with the pressure exerted thereupon. Two connecting lines 16, which are connected with electrodes of the platelets 15, lead to a speed control circuit as illustrated in FIG. 4 and to be described below. The platelets 15 also function as end stops for movement of the ends of the rocker 13 during actuation of the rocker 13. The upper end of the rocker 13 is marked R for clockwise or right hand rotation of the motor, and the lower end is marked L for counterclockwise or left hand rotation.

Figure 3:
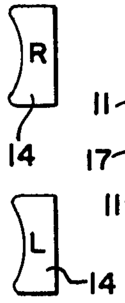
FIG. 3 shows a modification of the switching arrangement of FIG. 2.

FIG. 3 shows two depressable keys 14, the upper one marked R and the lower one L. In certain circumstances the rocker or bar 13 in FIG. 2 can be replaced by the two keys 14, each key 14 being attached to the respective push pin 10 and being depressable against the spring 11 to actuate the respective switch 4 or 5 and the associated platelet 15. Although this modification can be employed to obtain the advantages of combined reversing and motor speed control, the common rocker 13 of FIG. 2 is preferred for its safety feature of causing both switches 4 and 5 to be jointly actuated more readily then the rocker bar is "squeezed" hard in a shock reaction, for example upon seizing of the drill, to disconnect and brake the motor.

FIG. 4 illustrates diagrammatically in longitudinal section an electric drill embodying the switching arrangement of FIG. 2. The switch housing 9 is mounted inside the pistol grip handle 18 of the drill with the common rocker 13 protruding from the front of the handle 18 just below the drill housing 19. The rotor 1 is rotatably mounted in the housing 19 and has a commutator 20 with brushes 21 adjacent one end. A chuck 22 for releasably holding tools, such as drill bits, is mounted on the shaft of the rotor 1 in conventional manner. A stator assembly 23 surrounds the armature 1 and includes the field coil windings 2 shown in FIG. 2. The two switches in the switch housing 9, the field coil windings and the armature 1 are connected as shown in FIG. 2.

The drill housing 19 contains speed control circuitry 24 of known type which contains, for instance, an integrated circuit that sets or controls the speed of the motor 1, 2 as a function of a variable resistance via a controllable semiconductor switch, for example a Triac, as is well known in the art. However, in accordance with the present invention the variable resistance is provided by either of the platelets 15 depending upon the direction of rotation of the motor. In FIG. 4 the leads 16 from the two platelets 15 on the switch housing 9 can be seen connected to the speed control circuitry 24, the latter being diagrammatically illustrated by a box. The variation in the resistance of each platelet 15 occurs as greater or lesser pressure is applied thereto via the respective end of the actuating rocker 13, or the keys 14 as the case may be. Accordingly, the platelets function as limit stops for depression of the rocker and enable the speed of the motor in either direction of rotation to be set or adjusted by the degree of pressure that is applied to the platelets by the pressure of the operator's finger on the rocker 13.

The electrically conductive synthetic material of the platelets or small pads 15 is commercially available. Such synthetic material can have different electrical and mechanical properties. One form of such material involves, for example, a fine-pore foam that is subsequently impregnated with a conductance generating substance, or a synthetic material into which a conductive substance, for example carbon, has been incorporated. Electrodes are applied on one side or even on both sides of the platelet made of such material. If desired these electrodes can be made in comb-like intermeshing fashion to reduce the resistance created. These platelet devices have a pressure-variable resistance that can be used in place of conventionally adjustable resistances with a carbon track and a sliding wiper to control the speed of the motor. The application of platelets of electrically conductive synthetic material as limit stops for key or rocker switches to control the speed of a motor by means of a variable resistor is of significance even independently of the operation of reversing the direction of the motor. Particularly advantageous is the insensitivity of the conductive synthetic material platelet to external influences and the smooth, virtually stepless, change of the resistance value.

Thus, according to the present invention, a handheld electric power tool is provided with a fast reversal in the direction of rotational drive and at the same time a convenient manner of instantly controlling the speed in either direction of rotation. Further, inadvertent actuation simultaneously of both directions of drive immediately interrupts the current supply and, in addition, short circuits the armature thereby causing a braking effect without any damage to the motor or switching arrangement. As previously mentioned, this is particularly advantageous as a safety feature if both switches are depressed in a shock reaction, for example upon seizure of a drill bit. Also, the motor is disconnected, with accompanying braking, when the respective switch being depressed for a selected direction of drive is released. The braking and slowing down of the motor upon such disconnection is important in normal usage to reduce the risk of injury when the portable power tool is put aside while containing a tool bit in its chuck. By appropriately designing the circuitry, this braking effect can be utilized to enable the motor to be reversed abruptly at high speed.

The above described embodiments, of course, are not to be construed as limiting the breadth of the present invention. Modifications, and other alternative constructions, will be apparent which are within the spirit and scope of the invention as defined in the appended claims.

What is claimed is:

1. A portable power tool, comprising:

a housing having a handle;

an electric motor mounted in the housing and having an armature with a commutator;

two switches for respectively effecting rotation of the armature in opposite directions of rotation, each switch having a center contact movable between a rest contact and a working contact, the armature being connected between the two center contacts, the working contacts being interconnected, the rest contacts being interconnected, and the working and rest contacts being arranged to be connected across a source of line voltage;

a rocker bar mounted on said handle and connected to both said movable center contacts for actuation thereof;

resilient means for urging said rocker bar away from said handle to a position in which both movable center contacts engage both rest contacts and supply of power to the motor is interrupted;

either end of said rocker bar being independently depressable towards said handle to actuate either switch individually to engage the movable center contact thereof with the working contact thereof and effect rotation of the armature in one direction or the opposite direction thereto dependent upon which switch is actuated;

said rocker bar also being depressable as a whole towards said handle to actuate both switches jointly and short circuit said armature, whereby when said rocker bar is unintentionally squeezed hard in a shock reaction of the tool's operator both switches are actuated effecting interruption of supply of power to the motor and braking thereof; and speed control circuitry and two members of electrically conductive synthetic material whose resistance changes as a function of the pressure exerted thereon forming part of the speed control circuitry, said members being associated with said rocker bar whereby when either switch is actuated a respective one of said members is subjected to pressure, the extent of this pressure being used to control the speed of rotation of the armature in the selected direction of rotation.

2. The portable power tool of claim 1, wherein said rocker bar is connected to said movable center contacts via pressure pins, the pins being connected to the rocker bar adjacent opposite ends thereof, and said resilient means comprises a spring associated with each pressure pin for urging the adjacent end of the rocker bar outwardly with respect to said handle.

3. The portable power tool of claim 1, wherein said motor comprises two field windings, the rest contacts each being connected in series with one of the field windings and the working contacts each being connected in series with the other field winding.

4. A portable power tool, comprising:

a housing having a pistol grip handle;

an electric motor mounted in said housing and having an armature with a commutator;

speed control circuitry for controlling the speed of rotation of said armature;

a switch housing mounted in said handle and containing two switches for respectively effecting rotation of said armature in opposite directions of rotation;

each switch having a movable contact movable between a rest contact and a working contact, and said armature being short circuited when said movable contacts engage both working contacts;

a rocker bar having pressure pins extending from adjacent the ends thereof and respectively connected to said movable contacts for movement thereof, said pins passing through a wall of said switch housing;

said rocker bar protruding from said handle at a location for depression into said handle towards said switch housing by one or more fingers of an operator's hand holding the handle;

a compression spring associated with each pressure pin and disposed between said wall and a respective end of said rocker bar for urging said rocker bar outwardly away from said switch housing and to move said movable contacts into engagement with said rest contacts;

a collar on each pressure pin for engaging said wall to limit outward movement of said rocker bar;

either end of said rocker bar being independently depressable towards said handle against the action of one of the springs to actuate either switch individually to effect rotation of said armature in one direction or the opposite direction thereto dependent upon which switch is actuated;

two platelets of electrically conductive synthetic material whose resistance changes as a function of the pressure exerted thereon forming a part of said speed control circuitry, said platelets being mounted in spaced apart relationship on said wall beneath the ends of said rocker bar and functioning as stops to limit manual depression of said rocker bar when said switches are actuated, whereby when either switch is actuated a respective one of said platelets can be subjected to pressure by the respective end of said rocker bar, the extent of this pressure being used to control the speed of rotation of said armature in the selected direction of rotation; and said rocker bar also being depressable as a whole towards said handle to actuate both switches jointly, whereby when said rocker bar is unintentionally depressed hard in a shock reaction of the tool's operator, both switches are actuated effecting short circuiting of said armature with consequential braking of the motor.

* * * * *